Figure 1:
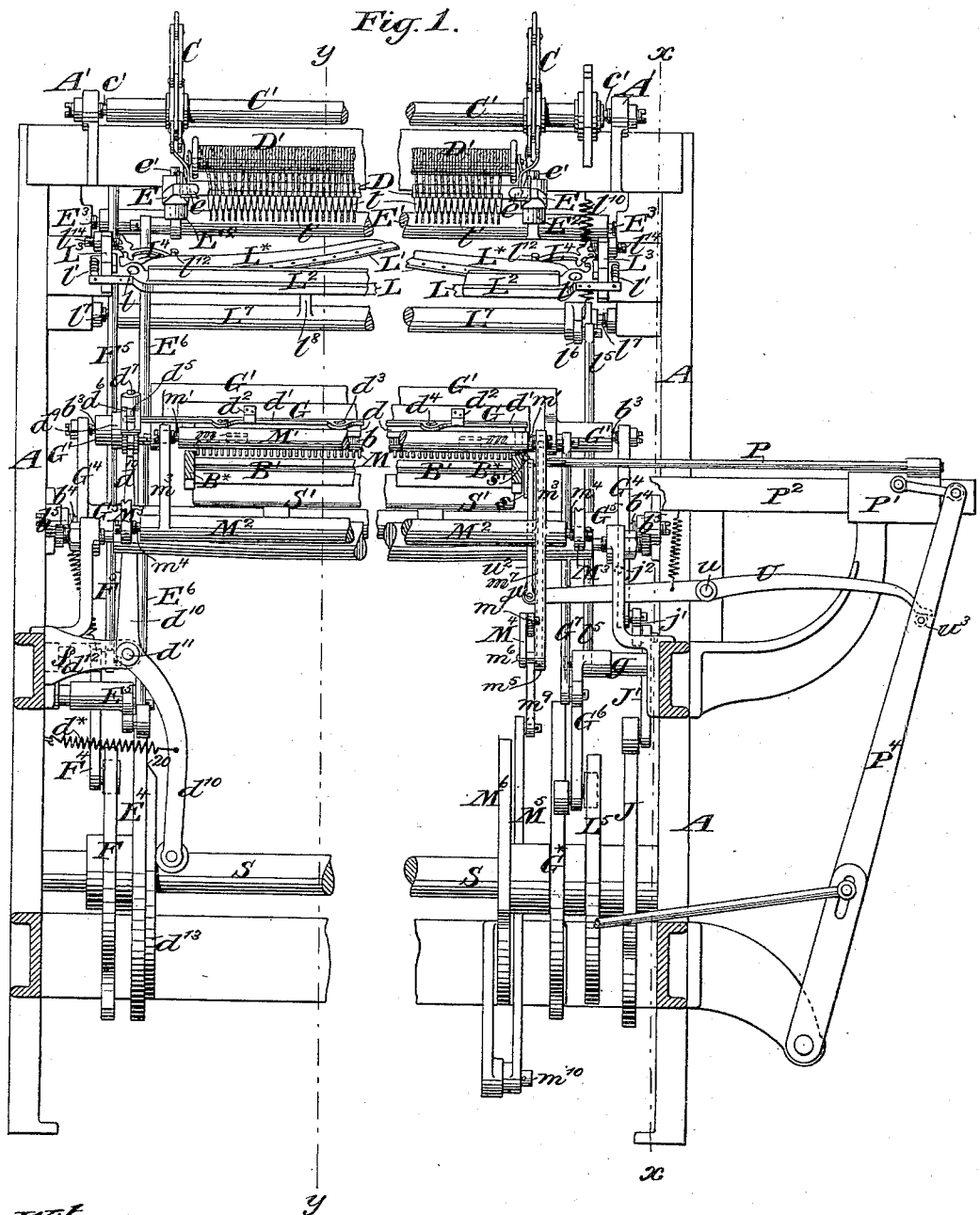

(No Model.) 7 Sheets—Sheet 1.

H. SKINNER & F. H. CONNOLLY.
LOOM FOR WEAVING TUFTED PILE FABRICS.

No. 449,337. Patented Mar. 31, 1891.

Witnesses:
C. Sundgren
L. N. Legendre

Inventors
Halcyon Skinner
Frank H. Connolly
by attorneys
Brown & Seward (No Model.) 7 Sheets—Sheet 2.

H. SKINNER & F. H. CONNOLLY.
LOOM FOR WEAVING TUFTED PILE FABRICS.

No. 449,337. Patented Mar. 31, 1891.

Witnesses:
C. E. Sundgren
L. N. Legendre

Inventors:
Halcyon Skinner
Frank H Connolly
by attorneys
Brown & Seward (No Model.) 7 Sheets—Sheet 4.
H. SKINNER & F. H. CONNOLLY.
LOOM FOR WEAVING TUFTED PILE FABRICS.
No. 449,337. Patented Mar. 31, 1891.

Witnesses:
C. L. Sundgren
D. N. Hayward

Inventors:
Halcyon Skinner
Frank H. Connolly
by attorneys
Brown & Seward (No Model.)  7 Sheets—Sheet 5.

H. SKINNER & F. H. CONNOLLY.
LOOM FOR WEAVING TUFTED PILE FABRICS.

No. 449,337.  Patented Mar. 31, 1891.

Witnesses:
C. L. Sundgren
L. N. Legendre

Inventors:
Halcyon Skinner
Frank H. Connolly
by attorneys (No Model.) 7 Sheets—Sheet 6.

H. SKINNER & F. H. CONNOLLY.
LOOM FOR WEAVING TUFTED PILE FABRICS.

No. 449,337. Patented Mar. 31, 1891.

Witnesses:

Inventors:
Halcyon Skinner
Frank H Connolly
by attorneys

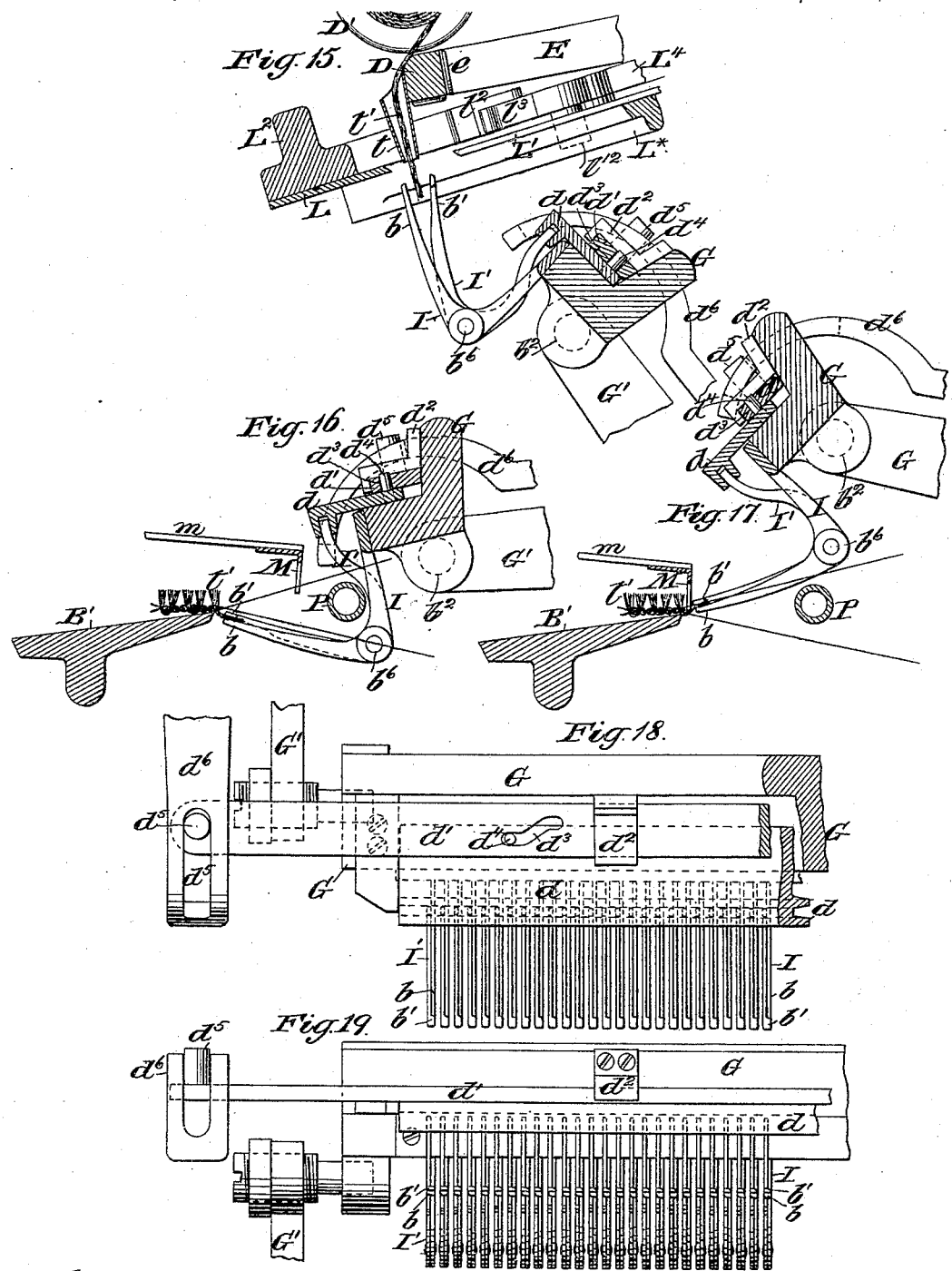

UNITED STATES PATENT OFFICE.

HALCYON SKINNER AND FRANK H. CONNOLLY, OF YONKERS, NEW YORK.

LOOM FOR WEAVING TUFTED PILE FABRICS.

SPECIFICATION forming part of Letters Patent No. 449,337, dated March 31, 1891.

Application filed July 29, 1890. Serial No. 360,308. (No model.)

*To all whom it may concern:*

Be it known that we, HALCYON SKINNER and FRANK H. CONNOLLY, both of Yonkers, in the county of Westchester and State of New York, have invented a new and useful Improvement in Looms for Weaving Tufted Pile Fabrics, of which the following is a specification, reference being had to the accompanying drawings.

This invention relates to looms for weaving that class of tufted fabrics in which the tufts are looped around the weft-threads, as in what are known as "Moquette carpets."

Before explaining our invention in detail we will refer briefly to the means heretofore employed in such looms for depositing the tufts in their places in the fabric and to their method of operation. In such looms the tuft-yarns are supplied from spools arranged in carriages which are hung in carrying-chains, by which the said spools and carriages are successively presented in convenient proximity to the warp to perform or permit the performance of the tufting operation. In some of these looms the spool-carriages with the tuft-yarn spools have been removed from the carrying-chains and brought down near the fell of the cloth, and then such movements have been given to them as to make them insert the ends of the yarn between the threads of the warp, so as to be woven in by the usual weaving operation. In others of these looms the spool-carriages and their spools have always remained connected with the chains, and the required quantity of yarn has been drawn from the spools by means of nippers, which seize the ends of the yarn, draw off a sufficient quantity thereof to form a row of tufts, and, after the pieces to form the tufts have been cut from the body of yarn on the spool, carry these tuft-pieces down and by various complex movements insert them in their places to be woven in the web.

In the loom hereinafter described, illustrating our improvement, the spool-carriages and spools are detached from the chains and carried down part of the distance between the chains and the warp, where they are met by nippers, which grasp the ends of the yarn, after which a slight upward movement of the spool-carriages and the spools draws off sufficient yarn to form the row of tufts, and the portions so drawn off are cut from the body of the yarn. The nippers then by a single movement carry down through the warp one end of each of the tuft-pieces so cut off and hold the said pieces in position to be woven in. In this position the free ends of the tuft-pieces project above the warp close to the fell and rest against the last row of tufts woven in, the ends of the tuft-pieces held by the nippers being below the upper threads of the warp, so that a shot of weft inserted into the shed above the nippers and the ends of the tuft-pieces held by them bind the tufts into the web. When this shot has been beaten up into its place, the nippers rise and carry back through the warp the ends of the tuft-pieces which they still grasp. As the nippers thus rise the shed is changed and another shot of weft is inserted and beaten up to further secure the tufts. As soon as the second shot is in its place the nippers release the ends of the tuft and move up to take the yarn for the next row of tufts, and while they are doing this a third shot of weft may be inserted to complete the operation. While the above movements are being performed the spool from which the tufts were cut is raised and connected again with the carrying-chains, the chains are moved forward, and another spool is brought forward to meet the nippers. By this mode of operating the spool-carriages and the nippers, the spool-carriage only having to be brought down part of the way to the warp, the nippers have a shorter range of motion than when they take the yarn from the spools in the carrying-chain, and they can be operated more quickly and the product of the loom is increased.

We will describe our invention in detail with reference to the drawings, and afterward point out its novelty in the claims.

Figure 2:
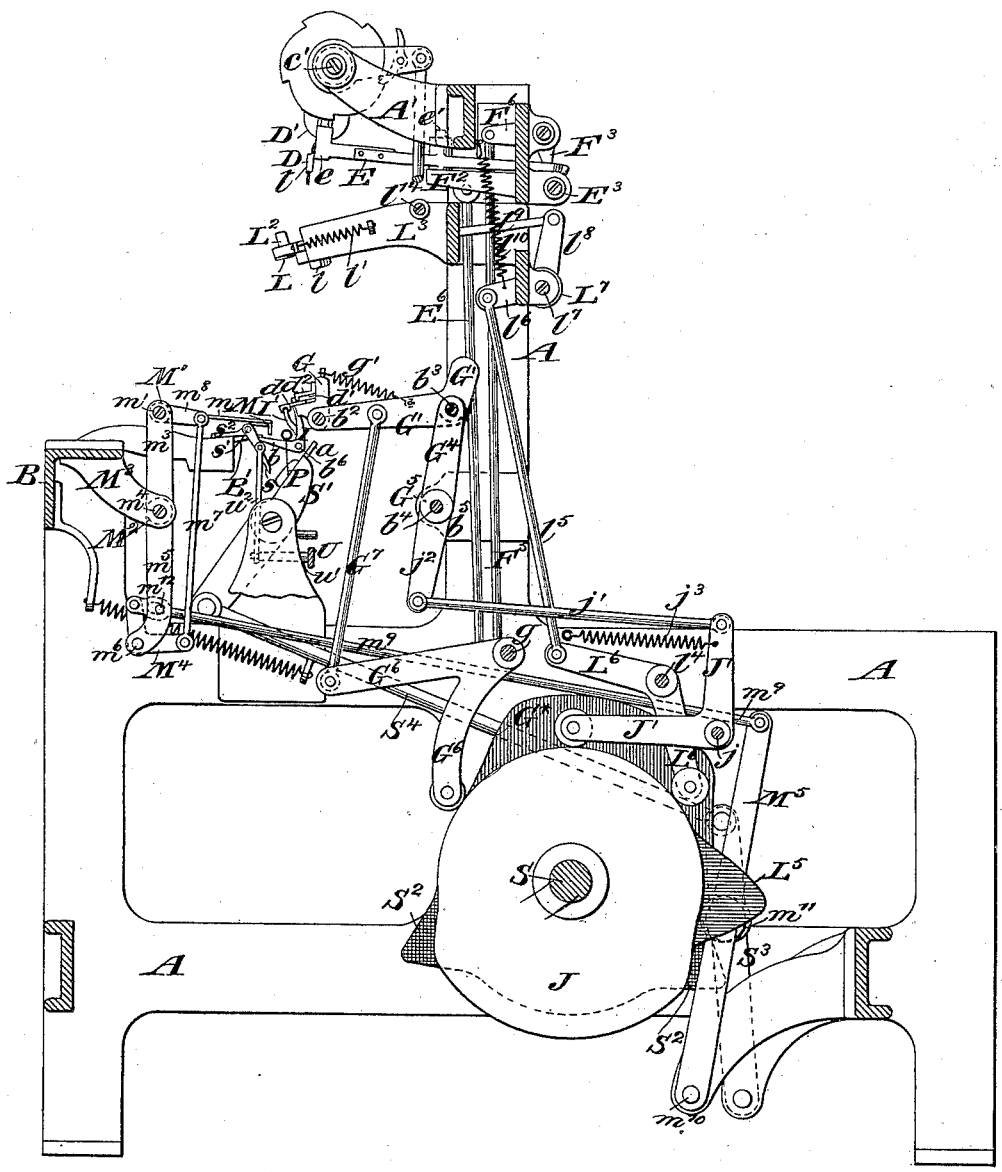
Figure 3:
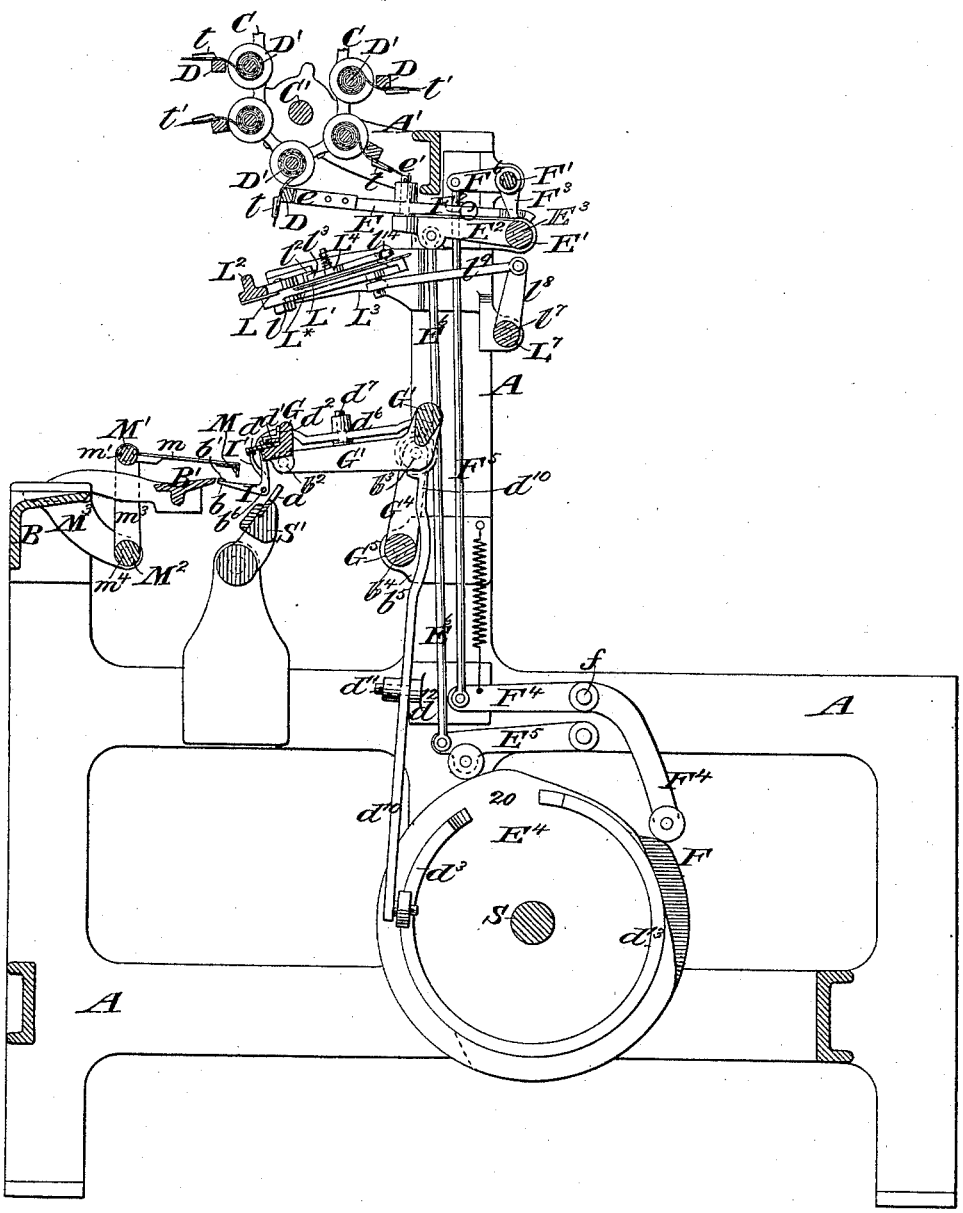

Figure 1 represents a front view of a loom illustrating our invention, the breast-beam being omitted in order to expose the working parts more fully to view, and the central portion of the width of the loom being omitted to economize space in the drawings. Fig. 2 represents a vertical section in the line $x\,x$ of Fig. 1, viewed from the right-hand side of that figure. Fig. 3 represents a vertical section parallel with Fig. 2 in the line $y\,y$ of Fig.

Figure 4:
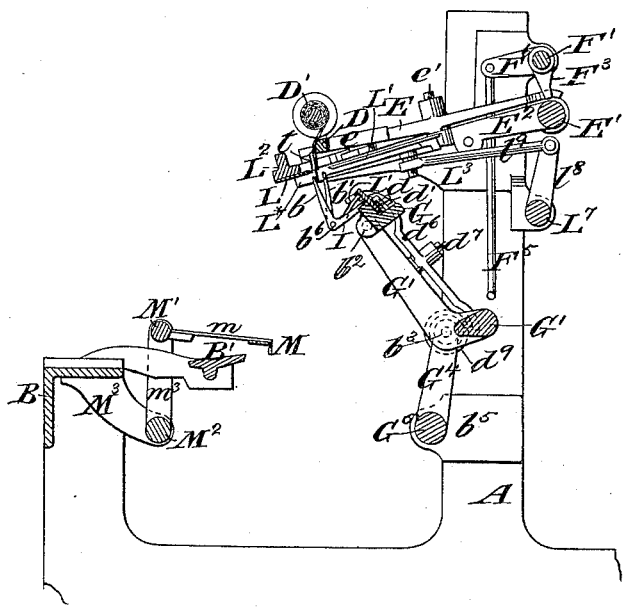
Figure 5:
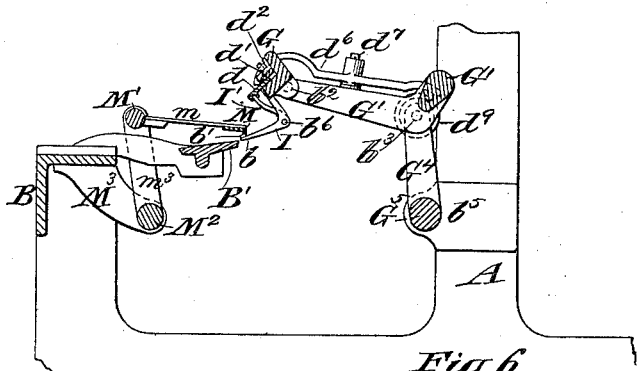
Figure 6:
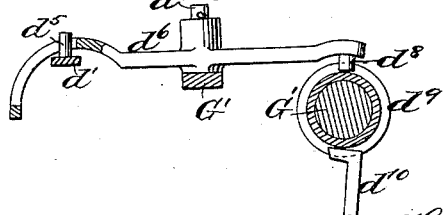
Figure 7:
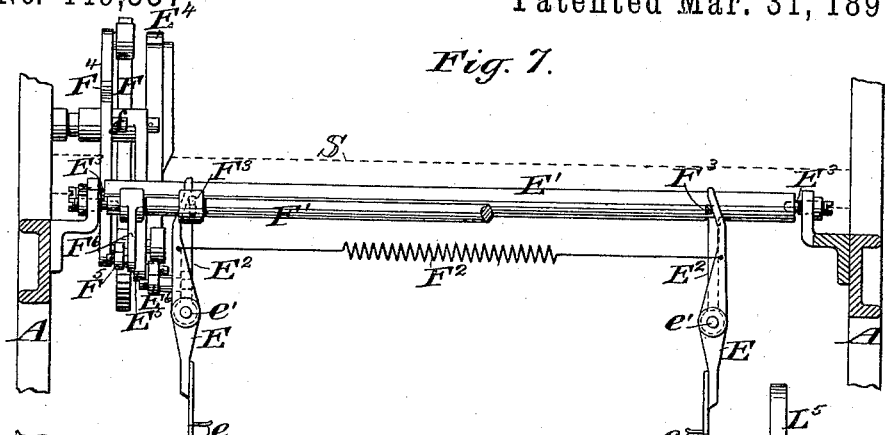
Figure 8:
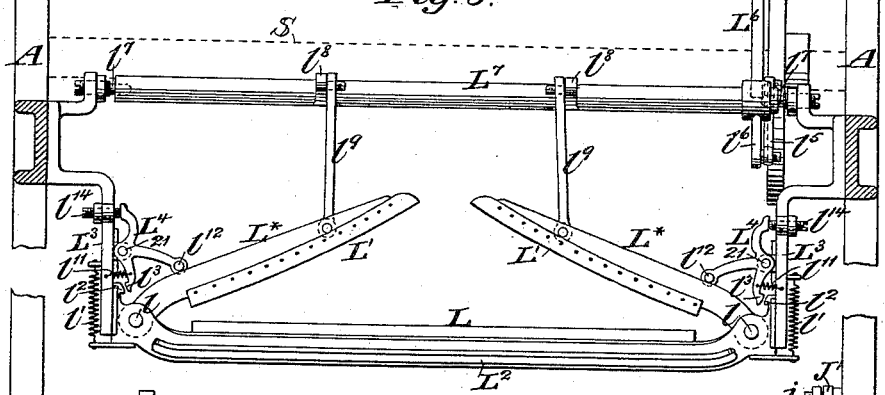
Figure 9:
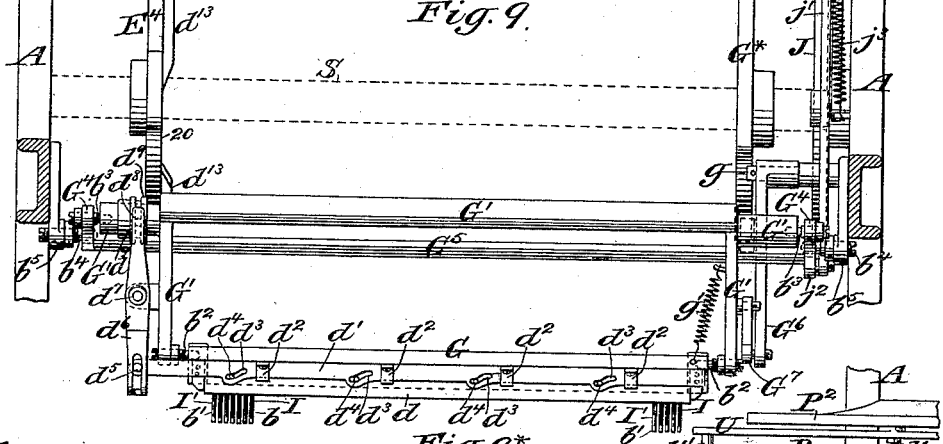
Figure 10:
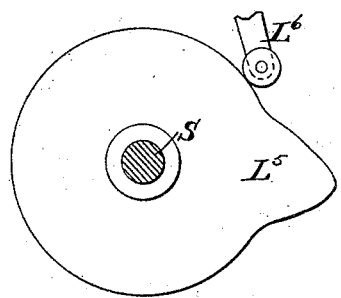

1, viewed from the right. Figs. 4 and 5 represent vertical sections of the tufting mechanism corresponding with Fig. 3, but showing the parts in different positions. Fig. 6 is a side view, on a larger scale, of certain parts imperfectly represented in Figs. 3, 4, and 5. Fig. 7 is a plan view of mechanism for removing the tuft-yarn spools from the carrying-chains and replacing them therein. Fig. 8 is a plan view of the shears and their operating mechanism for cutting the pieces of yarn to form the tufts. Fig. 9 represents a plan of the nippers and their operating mechanism for inserting the tuft-pieces into the web. Fig 9* is a plan view of certain parts of the loom, including what we call the "weft-finger," for pushing up the weft near one selvage preparatory to the action of the reeds, and part of the mechanism for operating said weft-finger. Figs. 10, 11, 12, 13, and 14 are side views of those of the cams in the loom which are not plainly visible in Figs. 2 and 3. Figs. 15, 16, and 17 are vertical sectional views of the tuft-inserting devices corresponding, respectively, with Figs. 4, 3, and 6, but on a larger scale. Fig. 18 is a plan view on the same scale as Figs. 15, 16, and 17 of several of the nippers and part of their operating mechanism. Fig. 19 is a front view corresponding with Fig. 18.

A designates the main framing of the loom, B the breast-beam, and B' the web-supporting plate, represented as of ordinary construction.

S' is the lay, which may be operated by any suitable means, but is represented in Fig. 2 as operated by a cam $S^2$ on the main shaft S through a lever $S^3$ and connecting-rod $S^4$. The lay has its reed $a$ open at the top, its dents projecting upward like the teeth of a comb.

The heddles and harness-motion are not represented in the drawings, and it is not necessary to describe them further than to say they may be similar to those used in other well-known looms for weaving tufted fabrics—for instance, that which is the subject of Letters Patent No. 186,374.

C C are the movable spool-supports, represented as consisting of spool-carrying chains constructed and arranged and operated as in other looms for weaving tufted fabrics—as, for instance, in the loom described in Letters Patent No. 16,037. Only the lower parts of these chains and their lower shaft C' are represented, these being sufficient to illustrate the present improvement. The shaft C' is represented as being supported between center-screw bearings $c'$ in brackets A', secured to the upper part of the main framing A. The spool-carriages D, in which the tuft-yarn spools D' are or may be supported, are substantially like those commonly employed in other looms, being provided with tins $t$, through which the yarns are delivered, and they are supported in the same way in the chains C.

E E are the spool-carriage holders by which the spool-carriages D are taken from the chains and carried down to and held in a position some distance above that occupied by the warp to present the tuft-yarns to the nippers $b\ b'$, by which the tuft-pieces, after they have been cut from the said yarns, are inserted into the web. These holders are represented as like those used in some other looms for weaving tufted fabrics for taking the spool-carriages from the chains—that is to say, they consist of levers E E, furnished with clutches $e\ e$. The said levers E E are pivoted at $e'$ to the arms $E^2$ of a rock-shaft E', which is supported in suitable bearings $E^3$ in the loom-framing. The oscillation of the rock-shaft E', by which the movement of the said levers up and down to take the spool-carriages from the carrying-chains and return them thereto, is effected by means of a cam $E^4$ on the main shaft S of the loom (see Fig. 3) acting upon a lever $E^5$, which is connected by a rod $E^6$ with one of the arms $E^2$ of the said rock-shaft. The lateral movement of the said levers E upon their pivots $e'$ for taking hold of the spool-carriages preparatory to removing them from the carrying-chains and for letting them go again when they are replaced in the chains is effected in part by the action of a cam F on the main shaft S upon the oscillating cam-shaft F' (see Figs. 3, 4, and 7) and in part by a spiral spring $F^2$, (see Fig. 7,) the said spring exerting a constant tendency to draw the rear arms of the said levers E toward each other and so hold the clutches apart, and two cams $F^3$ on the said shaft F' acting against the inclined inner faces of the rear ends of the said levers at the proper time to draw the clutches $e$ toward each other for the purpose of taking hold of the carriages. The said cam F acts upon the oscillating shaft F' through a lever $F^4$, which works on a fixed fulcrum $f$ on the main frame A, the said cam acting on one end of the said lever, and the other end of the latter being connected by a rod $F^5$ with an arm $F^6$ on the said oscillating shaft. The cams $F^3$ consist of downwardly-projecting arms or fingers. One of these is shown in section toward the right hand of Fig. 7, in which figure a part of the shaft F' is omitted for the purpose of better illustrating the action of the cams upon the clutch-levers.

The nippers $b\ b'$, hereinbefore mentioned, are attached to a horizontal bar G, which is pivoted between center screws, as shown at $b^2$, (see Figs. 2, 3, 4, 5, and 9,) in the two arms of a swinging frame G', which is pivoted, as shown at $b^3$, between the two arms $G^4$ of a rock-shaft $G^5$, which is pivoted, as shown at $b^4$, in brackets $b^5$, secured to the main framing A. The jaw $b$ of each pair of nippers is formed at one end of an elbow-like member I, the other end of which is rigidly secured to the bar G, as shown in Figs. 2, 3, 4, and 5, and more plainly in Figs. 15 to 17. The other jaw $b'$ is formed at one end of another elbow-hooks $l^2$ on the cutter-bar $L^2$. The laterally-projecting arms of the said levers $L^4$ are furnished with pins or projections $l^{12}$ to come in contact with the backs of the cutter-arms $L^*$, and opposite the rear arms of the said levers adjustable stop-screws $l^{14}$ are provided on the brackets $L^3$.

The operation of the cutter is as follows: At all times, except during the act of cutting, the shears or cutters remain open, as shown in Figs. 3, 4, and 8, the cutter L being far enough forward for the tins $t$ to pass behind them, as may be understood by reference to Figs. 4 and 15, when the spool-carriages are carried down toward the nippers to present the yarns to the latter. The cutters are so held open by the action of the spring $l^{10}$ through the rock-shaft $L^7$ and its connections, which are caused to exert a backward pull against the cutter-arms $L^*$. The said arms then constitute levers to which the pins or projections $l^{12}$ on the levers $L^4$ are fulcrums, the said levers then being held stationary against the stop-screws $l^{14}$ by the pressure of the arms $L^*$ against the said fulcrum projections $l^{12}$. The leverage thus exerted by the arms $L^*$ serves to push the cutter L forward at the same time that the cutters $L'$ are held back. The pressure of the arms $L^*$ against the three-armed levers $L^4$ also holds the hooks $l^3$ of the said levers out of engagement with the hooks $l^2$ on the cutter-bar $L^2$. When at the proper stage of the rotation of the shaft S for the operation of the cutters the offset portion of the cam $L^5$ comes into operation on the lever $L^6$, and the arms $l^8$ of the rock-shaft are caused to push forward the cutter-arms $L^*$ away from the three-armed levers $L^4$, the springs $l'$ are allowed to pull back the cutter-bar $L^2$ until the hooks $l^2$ of the said levers engage with the hooks on the said bar and so lock the said bar to the stationary brackets $L^3$ in a position for the tuft-yarns which are presented between the edges of the cutters L and $L'$ to be cut off by the continued forward movement of the cutters $L'$, produced by the action of the cam $L^5$, as hereinbefore explained. After the offset part of the said cam $L^5$ has passed by the elbow-lever $L^6$ the spring $l^{10}$ again comes into action on the arm $l^6$, and through it on the rock-shaft $L^7$, the arms $l^8$ of which then pull back the cutter-arms $L^*$ against the projections $l^{12}$ of the levers $L^4$ and so disengage the hooks $l^3$ of the said levers from the hooks $l^2$ of the cutter-bar. The several parts of the cutting mechanism are then caused by the continued action of the spring $l^{10}$ to resume the positions hereinbefore described with reference to Figs. 3, 4, and 8 and fully illustrated in Fig. 8.

M, Figs. 1, 2, 3, 4, and 5, is what we term an "auxiliary reed," which we employ for the purposes of beating or drawing the tuft-binding shots of weft into their places while the nippers remain stationary and holding the said shots in place not only while the nippers are raised to carry or turn back through the warp behind the said shots the ends of the tuft-pieces which had been depressed through the warp, but also while a second shot of weft is inserted behind the turned-back ends and is beaten up by the ordinary or principal reed. This auxiliary reed has its dents open at their bottoms, giving it the form of a rake-head, which is carried by the arms $m$ $m$ of a rock-shaft $M'$, which is pivoted at $m'$ $m'$ in the arms $m^3$ $m^3$ of a rock-shaft $M^2$, which is pivoted at $m^4$ $m^4$ in brackets $M^3$, secured to the breast-beam. The said rock-shaft $M^2$ has another arm $m^5$, in which is fulcrumed at $m^6$ (see Figs. 1 and 2) an elbow-lever $M^4$. One arm of this elbow-lever is connected by a rod $m^7$ with an arm $m^8$ of the rock-shaft $M'$, and the other arm of said elbow-lever is connected by a rod $m^9$ with the upper end of a lever $M^5$, which works on a fixed fulcrum $m^{10}$, secured on the loom-framing, and which carries an anti-friction-roller $m^{11}$, which runs on the periphery of a cam $M^6$ on the main shaft S. The connection of the rod $m^9$ with the elbow-lever $M^4$ has no lost motion; but the said rod $m^9$ has a connection also with the arm $m^5$ of the rock-shaft $M^2$ by means of a slot and pin $m^{12}$, as shown in Fig. 2, which provides for a certain amount of lost motion between the said rod and the said arm. The cam $M^6$ acts through the said lever $M^5$ and connections first to depress the auxiliary reed M through the warp behind a shot of filling which has been put in and afterward to draw forward the said reed to make it beat up the said shot toward the fell. The depression of the reed M is produced by the action of the rod $m^9$, without any lost motion, on the elbow-lever $M^4$, as will be readily understood by reference to Fig. 2, and the drawing forward of the said reed is afterward produced by the continued movement of the said rod after the lost motion in the slot-and-pin connection $m^{12}$ has taken place. This auxiliary reed, holding onto the binding-shot, prevents it from springing back in the shed, as it has been heretofore apt to do when only a single reed has been used, as the dents of the said auxiliary reed operating from above the warp and entering the latter above the nippers, as shown in Fig. 16, will not interfere with the nippers while they are in their lowest position. (Represented in Figs. 3 and 16.) The auxiliary reed also assists materially in keeping the body of the weft up to its place by holding the tuft-shot in place until the next shot is beaten up.

$s$, Figs. 1, 2, and 9*, is what we term the "weft-finger." Before explaining this weft-finger we will state that in carrying out our invention we use a needle P for inserting the weft into the warp, and that in order to allow the auxiliary reed and nippers to operate it is necessary to use an open-top reed, such as $a$, hereinbefore mentioned, with very short dents, that it may project only very little above the warp when it is in its most forward position, as if the dents were long they would interfere with the nippers while the latter are like member I', which is pivoted, as shown at $b^6$, to the first-named elbow near the angle thereof. The other ends of the several elbows I' are received in a straight groove formed in the under side of a bar $d$, which projects over the front edge of the bar G, and which is capable of sliding backward and forward over the said edge, the said bar $d$ being confined to the said bar G by a bar $d'$, which is fitted to slide lengthwise of the bar G, and which is itself confined to the said bar by angle-guides $d^2$, secured to the said bar G. The longitudinally-sliding bar $d'$ has provided in it, as shown in Fig. 9, several oblique slots $d^3$, which receive pins $d^4$, which are firmly secured in and project upward from the bar $d$. By means of these slots and pins the longitudinal movement of the bar $d'$ is caused to produce a backward-and-forward movement of the bar $d$, by which the movable jaws or members of the nippers which are engaged with the groove of the last-mentioned bar, as shown in Figs. 2, 3, 4, 5, 15, 16, 17, and 18, are operated to grasp and release the tuft-yarns and tufts.

Figure 11:
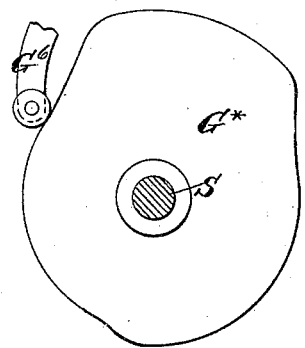
Figure 12:
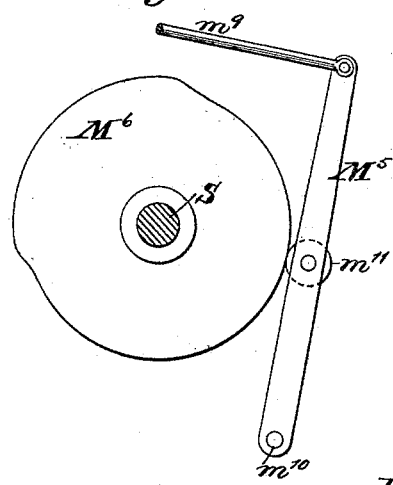
Figure 13:
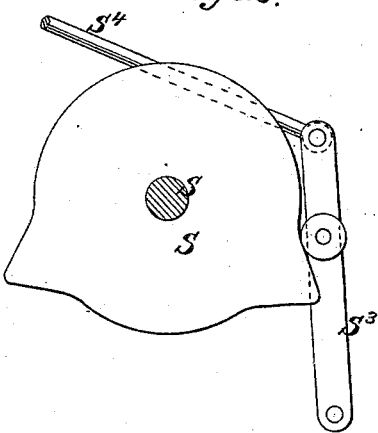
Figure 14:
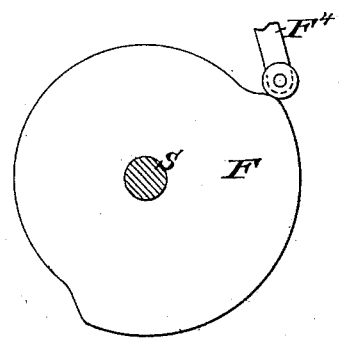

Besides the opening and closing movements given to their movable members I' $b'$, the nippers have three other movements—viz., an upward-and-downward movement produced by the movement of the swinging frame G' on its pivots $b^3$, a backward-and-forward movement produced by the oscillation of the rock-shaft $G^5$, the arms $G^4$ of which carry the said frame G', and a movement produced by the rocking of the bar G in said frame. The upward movement of the swinging frame G' is produced, as illustrated in Figs. 2 and 11, by a cam $G^*$ on the main shaft S acting upon one end of an elbow-lever $G^6$, which works on a fixed fulcrum $g$, and the other end of which is connected by a rod $G^7$ with the swinging frame G', and the downward movement is produced by the weight of the said frame and its attachments under the control of the said cam. The movement of the rock-shaft $G^5$ to produce the forward movement of the frame G' and nippers is produced, as illustrated in Fig. 2, by a cam J on the main shaft S acting upon one end of an elbow-lever J', which works on a fixed fulcrum $j$, and the other end of which is connected by a rod $j'$ with an arm $j^2$ of the rock-shaft $G^5$. The return movement of the rock-shaft $G^5$ and frame G' is produced by a spring $j^3$, which is connected with the elbow-lever J' and with the framing A. The rocking of the bar G in the frame G' is produced, in a manner which will be hereinafter explained, in part by the upward and forward movement of the swinging frame G' and in part by a spring $g'$, which connects the said bar with the said frame, as shown in Figs. 2 and 9.

For the purpose of providing for the longitudinal movement of the bar $d'$, by which the nippers are opened and closed, as hereinbefore explained, the said bar is connected at one end, as shown in Figs. 6, 9, 18, and 19, by a slot-and-pin connection $d^5$ with the curved end of a lever $d^6$, which works on a fulcrum-pin $d^7$, carried by one of the side arms of the rocking frame G'. The other end of the said lever is furnished with a pin or projection $d^8$, (see Fig. 6,) which enters a circumferential groove in a collar $d^9$, (see Figs. 1, 6, and 9,) which slides upon one of the pivot-gudgeons of the swinging frame G'. The said groove in the collar $d^9$ also receives the upper end of a lever $d^{10}$, (see Figs. 1, 3, and 6,) which works on a fixed fulcrum $d^{11}$ in a bracket $d^{12}$, secured on the framing A. The lower end of this lever $d^{10}$ is held by a spring $d^*$, Fig. 1, in contact with a cam $d^{13}$, which is represented in Figs. 1 and 3 as consisting of an interrupted concentric circular flange on one side of the cam $E^4$, hereinbefore mentioned. The flange has a uniform lateral projection, except that it terminates with inclines on both sides of its interruption 20. It operates on the lever $d^{10}$ in a direction to keep the nippers closed, and the spring operates to open them and keep them open while the interruption 20 of the cam is passing by the lower end of the said lever.

L and L' L' (see Figs. 1, 3, 4, and 8) are the cutters, consisting of shear-blades, of which the front one L, of a length not less than the whole width of the fabric to be woven, is represented as straight and firmly secured to a bar or stock $L^2$, the ends of which are fitted to slide in stationary ways in brackets $L^3$, secured to the loom-framing, the said ways having a downward and forward inclination. The rear cutters L', of which there are two, are each of a length at least equal to half the width of the web. They are carried by arms $L^*$, which are pivoted at $l\ l$ to the cutter-bar $L^2$, one near each end thereof. The cutter-bar $L^2$ is connected with the stationary brackets by springs $l'\ l'$, which tend to pull it backward, and the said bar is furnished, as shown in Fig. 8, with hooks $l^2$ to engage with hooks $l^3$ on the front ends of two three-armed levers $L^4$, which are pivoted at 21 to the brackets $L^3$ for the purpose of locking the said bar to the said brackets and holding it stationary during the cutting operation. This operation is effected by the swinging movement of the cutters L', produced by a cam $L^5$ on the main shaft S, the said cam operating on one end of an elbow-lever $L^6$, which works on a fixed fulcrum $l^4$ on the loom-framing, and the upper end of which is connected by a rod $l^5$ with one arm $l^6$ of a rock-shaft $L^7$, which is supported in bearings $l^7$ in the main framing, two other arms $l^8$ of the said rock-shaft being connected by rods $l^9$ with the cutter-arms $L^*$. The backward or opening movement of the cutters L' is produced by a spring $l^{10}$, (see Figs. 1 and 2,) of greater strength than springs $l'\ l'$, connecting the arm $l^6$ of the rock-shaft $L^7$ with a fixed point on the loom-framing. The hooks $l^3$ of the three-armed levers $L^4$ are connected with the brackets $L^3$ by springs $l^{11}$ for pulling them at the proper time into engagement with the holding the tufts for the second shot of weft to be beaten up. Now as the dents of such a reed must be very low in the shed when the reed is in its backward position, and as the weft-thread 25 at the instant when the needle is withdrawn from the shed is, as shown in Fig. 9*, a considerable distance back from the fell $v$ on that side of the loom from which the needle operates, and is also held up by the needle near the upper part of the shed, it is necessary to have some device for bringing the weft forward in the shed and also downward to bring it within reach of the dents of the reed. The weft-finger $s$ is the device which we provide for this purpose. This finger $s$ is a thin flat piece of metal arranged close outside of the line of the selvage on that side of the loom at which the needle enters and leaves the warp. It is pivoted, as shown at $s'$ in Figs. 1, 2, and 9, to a small bracket $s^2$, which is fastened to one of the brackets B*, which carry the web-supporting plate B'. The operative movement of the said finger is downward and forward, and may be produced by any suitable means, but in the example represented is produced through a lever U, (see Figs. 1 and 9*,) working on a fixed fulcrum $u$, one end of the said lever being connected by a pin $u'$ and rod $u^2$ with the weft-finger, and the other end being arranged to be acted upon every time the needle P is withdrawn from the warp by a projection $u^3$ (see Fig. 1) on the lever-arm $P^4$, which produces the movement of the carriage P', to which said needle is attached. As the needle P and its appurtenances constitute no part of the present invention, it is only necessary here to say of them that they may be such as are well known and in common use, and that the arm $P^4$, by which the weft-finger $s$ is operated, is similar to the arm commonly used for driving the needle-carriage. This weft-finger first depresses the weft-thread to the bottom part of the shed, and afterward carries it forward near the fell, where it is within reach of the reed $a$. It also serves the purpose of engaging the thread with the kind of forked needle which we prefer to employ, but which we do not here particularly describe, as it is subject-matter of our application for Letters Patent, Serial No. 360,307, filed July 29, 1890, and it serves the further purpose of taking up any slack of the weft that may not be taken up by the outward movement of the needle. The return movement of the weft-finger is produced by a spring $u^4$, which connects it with a fixed part of the loom.

It may be here mentioned that the main reed $a$, the auxiliary reed M, and the weft-finger are all made very light, though strong, and, all having a very short range of motion, may be operated very quickly.

Having now described the separate operations of those parts of the loom to which our invention relates, we will now briefly describe in proper order their operations in weaving.

We will first suppose a spool-carriage to have been taken from the chains and to have been brought down toward the nippers and the nippers to have ascended with their jaws open to a position to receive the ends of the tuft-yarns $t'$, as shown in Figs. 4 and 15. The nippers are then closed to take hold of the yarns, and the spool-carriage is lifted far enough to cause the pulling from the spool of a proper length of yarn to form the tufts, and while the nippers and spool-carriage remain stationary the cutters operate to cut off the tuft-pieces. The nippers then descend, as shown in Fig. 16, taking with them entirely through the warp very near the fell one end of each of the tuft-pieces. A shot of weft is then inserted by the needle into the warp above the nippers and behind the inserted portions of the weft-pieces. The auxiliary reed or comb M then draws up the said shot of weft to its place against the tuft-pieces, while the nippers remain stationary below the warp and afterward hold the said shot there while the nippers are raised to turn and carry back through the warp, as shown in Fig. 17, the tuft ends, which they still hold, and while another shot of weft is put in behind the so turned-back ends, and also while the last-mentioned shot is beaten up by the principal reed $a$. The nippers are then opened to release the tuft and they go up again to take a fresh supply of yarn. After the second shot of filling has been beaten up the shed may be changed and a third shot of filling put in before again changing the shed preparatory to the repetition of the above-described operations of inserting the tufts. This third shot of weft is to give body to the fabric; but its insertion constitutes no part of my invention, as such a shot is commonly used in tufted fabrics.

In the hereinabove-described operation the carrying back of the nippers through the warp from the position shown in Fig. 16 to that shown in Fig. 17 is produced by the upward and forward movement of the nipper-bar G with the carriage G'. It is necessary that this movement should be sufficient to take the elbows and back parts of the nippers high enough for the needle P to pass under them, while the tips of the nippers retaining the tuft-pieces should move a very little way. It is to provide for this difference of movement between the elbow or back parts and tips of the nippers that the nipper-bar G is pivoted to rock in the frame G' under the control of the spring $g'$, as hereinbefore described, and the frame G' is pivoted in the arms of the rock-shaft $G^5$, the said spring allowing the tips of the nippers to be held down by continued grasp of the tufts until the nippers are opened to let go of them.

One important advantage of our invention consists in the fact that the central portions of the nippers, while their jaws are holding the tufts in position and the parts which carry them and give them their opening and closing movements are entirely above the warp, are below the upper part of the shed, as shown in Fig. 16, so that a shot or weft may be put in by a needle and beaten up to its place at the fell, while they (the nippers) remain stationary and prevent any derangement of the tufts.

Another important advantage of our invention consists in the greater quickness with which the cutters having the two short blades L L operate in connection with one large one one as compared with cutters consisting of two long blades, each of a length sufficient to cut all across the series of tufts.

What we claim as our invention, and desire to secure by Letters Patent, is—

1. The combination, with the tuft-yarn spools and their carriages, the movable supports for said carriages, and spool-carriage holders for taking the said carriages from said supports and replacing them therein, of nippers for taking the tuft-yarn from said spools, cutters for cutting off the yarn from said spools in pieces to form tufts, mechanism for moving said nippers toward said spool-carriage holders to receive the yarns from the spools therein, mechanism for drawing back the spool-carriage holders from said nippers to draw off the yarn from the spools, and mechanism for operating said cutters after the drawing off of the yarn by the movement of the spool-carriage holder, all substantially as herein described.

2. The combination, with nippers for the insertion into the warp of one end of each of a series of tuft-pieces and returning the said ends through the warp and a weft-carrying needle, of a reed having its dents open at the bottom and arranged to enter the warp from above for the purpose of drawing up one shot of weft-thread to the fell after its insertion into the warp behind the tuft-pieces and holding said shot while the said ends are returned and while a second shot of filling is inserted, and mechanism for operating the said reed, the said nippers, and said weft-carrying needle, all substantially as herein described.

3. The combination, with nippers for inserting into the warp one end of each of a series of tuft-pieces and returning the said ends through the warp, of a bar which carries the said nippers, a frame in which said bar is capable of rocking and which is itself capable of swinging upward and downward and also backward and forward, and mechanism for producing the said rocking movement of said bar and the said swinging movement and said backward and forward movements of said frame, all substantially as herein set forth.

4. The combination, with the nipper-carrying bar G and attached nippers, of the swinging frame G', in which said bar is pivoted, the rock-shaft $G^5$, having fixed bearings and provided with arms in which the said swinging frame is pivoted, and mechanism for producing the upward and downward movement of the said swinging frame and the oscillation of said rock-shaft, all substantially as herein described.

5. The combination, with a nipper-carrying bar, of tuft-nippers consisting each of two elbows which are pivoted together at their angles and each of which has a jaw at one end and one of which is secured rigidly to said bar at its other end, substantially as herein described.

6. The combination, with the nipper-carrying-bar G and the elbow-shaped nippers, one member of each of which is attached rigidly at one end to said bar, of the backwardly and forwardly sliding bar $d$, with which the corresponding end of the other member engages for producing the opening and closing movement, the longitudinally-sliding bar $d'$, engaging with said bar $d$ by pins and oblique surfaces in one and the other, and mechanism for producing the longitudinal movement of said bar $d'$, all substantially as herein set forth.

7. The combination of the cutter-stock $L^2$, provided with hooks $l^2$, the cutter L, secured fixedly in said stock, the fixed guides $L^3$ for said stock, the cutter-arms $L^*$ and attached cutters L', pivoted to said stock, the levers $L^4$, having fixed fulcrums 21 and provided with projections $l^{12}$ to be acted upon by the cutter-arms L and with hooks $l^3$ to engage with the hooks $l^2$, the springs $l'$ for drawing back the stock $L^2$, the stops $l^{14}$ for the said levers, and mechanism for giving movement to the cutter-arms $L^*$, all substantially as herein described, and for the purposes herein set forth.

8. The combination, with the tufting-nippers, the open-topped reed, and a weft-inserting needle, of a weft-finger pivoted at a fixed point on that side of the loom from which said needle enters and capable of a forward movement for pushing the weft-thread forward in the warp, and means for operating said nippers, needle, and weft-finger, all substantially as herein set forth.

HALCYON SKINNER.
FRANK H. CONNOLLY.

Witnesses:
THOMAS ELLIOT,
HERBERT G. UNDERWOOD.